United States Patent [19]

Grietens

[11] 3,916,042
[45] Oct. 28, 1975

[54] PROCESS FOR THE APPLICATION OF AN ADHESIVE LAYER IN ALLOY WELDING

[75] Inventor: Joannes Grietens, Kasterlee, Belgium

[73] Assignee: Glaverbel-Mecaniver, Watermael-Boitsfort, Belgium

[22] Filed: Feb. 20, 1973

[21] Appl. No.: 333,789

[30] Foreign Application Priority Data
Feb. 18, 1972 Belgium .................................. 64802

[52] U.S. Cl. ................. 427/269; 427/251; 427/255; 427/284; 427/287; 427/424
[51] Int. Cl.² ............................................ B05D 1/02
[58] Field of Search .............. 117/43, 45, 71 R, 105, 117/105.3, 124 A, 124 B, 124 C, 160 R

[56] References Cited
UNITED STATES PATENTS

| 2,235,680 | 3/1941 | Haven et al. ....................... 161/45 X |
| 2,235,681 | 3/1941 | Haven et al. ....................... 161/45 X |
| 2,293,822 | 8/1942 | Haven ............................... 117/105 X |
| 2,938,494 | 5/1960 | Wampler et al. ...................... 118/74 |
| 3,293,065 | 12/1966 | Roetter ......................... 117/105.3 X |

*Primary Examiner*—Thomas J. Herbert, Jr.
*Assistant Examiner*—Bruce H. Hess
*Attorney, Agent, or Firm*—Cushman, Darby & Cushman

[57] ABSTRACT

A process of forming an adherent layer of solder alloy on a metallized surface portion of a sheet of glass preparatory to soldering to such surface portion a metallic member in which a soldering flux is sprayed onto the metallized surface portion to form a flux coating extending up to a predetermined boundary and then solder is supplied onto the flux coating and caused to spread out thereon to form a solder layer of requisite thickness extending up to at least a portion of the boundary and apparatus for carrying out the process.

14 Claims, 9 Drawing Figures

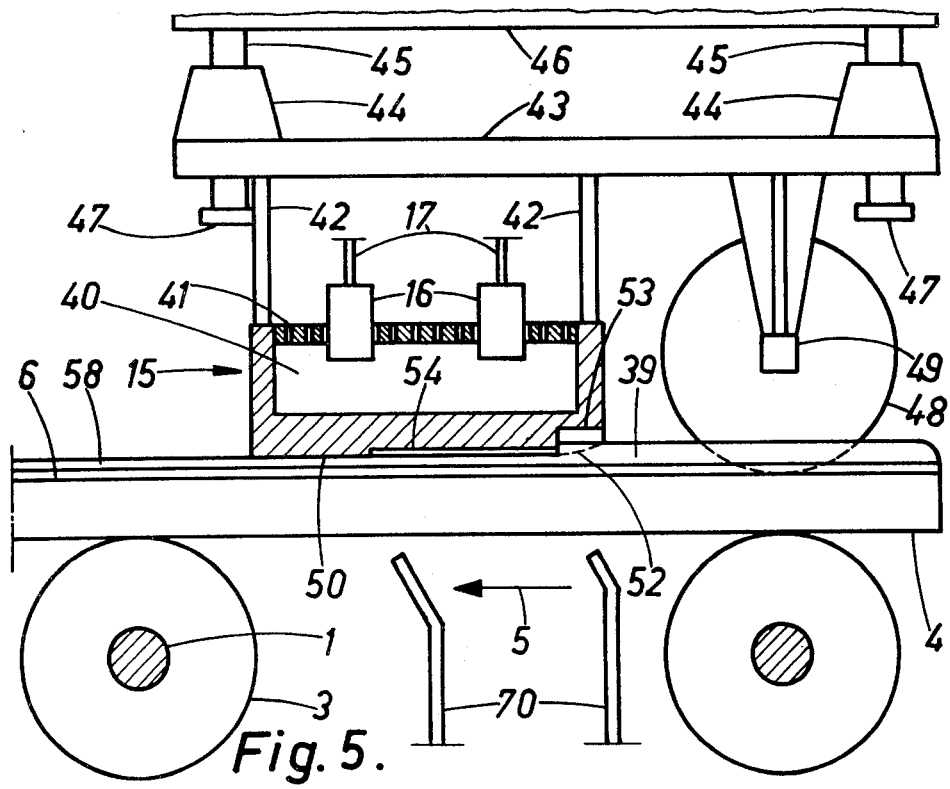
Fig. 5.
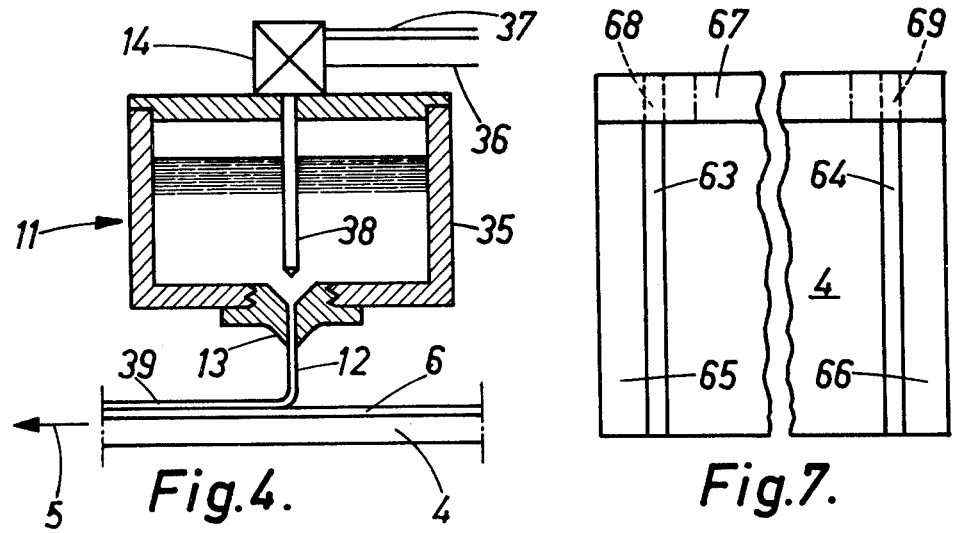
Fig. 4.
Fig. 7.

PROCESS FOR THE APPLICATION OF AN ADHESIVE LAYER IN ALLOY WELDING

This invention relates to a process of forming an adherent layer of solder metal on a metallized surface portion of a sheet of glass preparatory to soldering to such surface portion a metallic member. The invention also relates to apparatus for use in performing such process.

The formation of solder metal deposits on metallized surface portions of glass sheets is carried out, e.g., in the manufacture of hollow glazing panels coomprising sheets of glass connected in spaced relationship by one or more metallic spacer strips soldered to metallized margins of the glass sheets. When manufacturing such panels on a mass production basis and at competitive cost, it is necessary to apply soldering flux to the metallized margins of the sheets in order that a satisfactory adhesion of the subsequently applied solder may be achieved. The flux is conventionally applied by means of an applicator in the form of a wheel the circumferential face of which is impregnated with the flux. Although the flux applicator can be guided along a predetermined path it has proved impossible to confine the subsequently formed solder layer within predetermined boundaries unless the sheets are first cleaned to remove unwanted flux.

The need for the sheets to be cleaned before soldering is a serious disadvantage but the cleaning step cannot be dispensed with if products of high quality are to be produced. In the manufacture of such products it is of course very important to avoid encroachment of deposited materials upon the area of the panel which is exposed to view when it is mounted in a frame.

There is another circumstance also which makes accurate coating very important, and this is the fact that the mass production of such panels is facilitated if one pair of opposed margins of each sheet is both metallized and solder-coated before the other pair of opposed margins is metallized and solder-coated. When adopting that processing schedule it is most important for portions of the first applied metal coatings to be left completely free of superimposed flux and solder at least at the corner regions of the sheets in order to provide a key for the metal coatings subsequently to be applied along the contiguous margins of the sheet. It is of course necessary to restrict the width of the metallized margins so as to keep the transparent area of the panel as large as possible and it is in practice sometimes necessary for the said width to be no more than 2 mm in excess of the width of the superimposed layer of solder. Te width of the solder layer must therefore be controlled to very close tolerances in order that the very small excess width of the metal layer shall remain adequately exposed to provide a key for the metal to be applied along the contiguous sheet margins.

In view of the difficulties which have been experienced in practice in confining the flux to a part only of the width of the metallized marginal zones, some factories have resorted to a different processing schedule according to which all four margins are first metallized preparatory to the deposit of flux and solder but this schedule is much less satisfactory as it involves double handling of the sheets and takes up appreciably more work space.

The present invention aims to solve the problem explained above of forming on metallized glass sheet margins solder layers which are strongly adherent to such margins and which are at the same time confined within very close tolerances to predetermined areas. The invention also aims to provide a solution to this problem which is applicable in mass production processes at competitive cost.

According to the present invention there is provided a process of forming an adherent layer of solder metal on a metallized surface portion of a sheet of glass preparatory to soldering to such surface portion a metallic member, characterized in that soldering flux is applied onto said metallized surface portion by spraying, thereby to form a flux coating extending up to a predetermined boundary, whereafter solder is supplied onto the flux coating and the applied solder spreads or is spread out thereon to form a solder layer of requisite thickness extending up to at least a portion of said boundary.

It is an advantage of this process that the flux can be applied to form a coating with a well defined predetermined boundary. This is due to the fact that the flux is applied by spraying. The boundary can be determined by appropriate orientation of the spray in relation to the sheet to be coated and/or by using a guard or screen placed along such boundary to prevent atomized flux from reaching the surface areas which should be kept free from flux. Provided the flux is sufficiently finely atomized, the applied flux does not spread on the surface on which it deposits but forms thereon a very thin film. The limits of the area coated with flux can therefore be accurately predetermined in a way which is not possible when using the known method of application by means of a wheel applicator. When using that method the flux cannot be accurately confined within a predetermined boundary even by placing a guard or screen in contact with the sheet to be coated.

Once the flux has been applied to cover an area with a predetermined boundary, there is no problem in forming a solder layer confined by the same boundary because the subsequently applied solder tends to resist spreading over the flux boundary.

One very important use of the invention is for forming a solder layer covering a part only of the width of a metallized surface portion as is required when a first pair of opposed sheet margins are to be solder-coated before metallizing and soldering the contiguous margins as above described. Thus, in certain preferred embodiments of the invention, in which it is used for forming an adherent layer of solder alloy extending along a metallized margin of a sheet of glass, the flux is applied to form a flux coating over a substantially uniformly wide portion of the width of the metallized margin so as to leave an inner portion of the width of the metal coating free of applied flux. Such embodiments are of importance in the preparation of a first pair of opposed sheet margins of a glass sheet to be used in constructing a hollow glazing unit. The application of the flux onto a marginal zone which is of uniformly less width than the width of the metallized margin is an advantage from the point of view of ease of control and is recommended notwithstanding that for the purpose of providing a key for the metal layers subsequently to be formed on the second pair of opposed sheet margins the flux coating need only be of lesser width than the metal coatings at the corner regions of the sheet.

However it is to be understood that it is not an essential feature of the invention that the flux coating and therefore also the solder layer is confined to a part only of the metal-coated area of the glass sheet. The whole boundary of the flux coating and therefore the whole boundary of the subsequently formed solder layer may coincide with the boundary of the metal-coated area. For example, when metallizing and solder-coating first one pair of opposed sheet margins and then the other pair of opposed sheet margins there is often no need for portions of the widths of the second pair of metal-coated margins to be kept free from flux and subsequently applied solder. On the contrary, in the treatment of that second pair of margins the flux may be applied strictly up to the inner boundaries of the metal coatings, i.e. up to the boundaries running parallel with the edges of the sheet. The boundaries of the flux coating can likewise coincide with the boundaries of the metal coatings in the event that contiguous margins of a sheet are metallized before they are flux-coated. That procedure is also possible when applying the invention although for reasons already explained it is not the preferred procedure. The use of the invention in treatments involving the all-over coating of metallized margins with flux affords the advantage that the metal deposits can be fully and evenly coated with flux without soiling the adjacent uncoated areas of the glass sheet, thus avoiding the necessity for the sheet to be thoroughly cleaned after the coating operations have been performed.

Preferably the zone through the flux is sprayed is subjected to suction during spraying. The gas currents induced by aspiration assist in preventing entrainment of droplets outside the area to be coated. The use of a screen in addition to or as an alternative to the use of suction forces is not excluded from the scope of the invention.

Preferably the solder is supplied onto part only of the area of the flux coating so that complete covering of such flux coating, or coating of a required part thereof, is dependent on the spreading of the solder. It is easier to supply solder onto a part or parts only of the flux coating because there is no need for the solder to be supplied with the care that is necessary if the solder has to contact all parts of the flux coating to be covered without dependence on the spreading of the solder. When forming a solder layer so that it covers a flux coating present along a margin of a sheet of glass, the solder may, for example, be supplied onto a part only of the width of such margin, leaving the remaining part of such width, preferably a part which extends up to the inner boundary of such margin, to be covered as a result of spreading of the solder on the flux coating. It is to be understood that it is not an essential feature of the invention that the final solder layer completely covers the flux coating, although in most cases such complete covering is desirable. For example, the solder layer may be deposited or spread so as to extend up to the inner boundary of the flux coating but so that the solder layer does not extend right up to the outer boundary of the flux coating, i.e. the boundary which is at or adjacent the edge of the sheet.

In certain embodiments of the invention, the solder is supplied in the form of drops onto the flux coating. It is very easy to deposit the solder in molten condition in the form of drops. The drops may be deposited on all increments of the area of the flux coating, in which case the spreading of the solder is not required in order to spread the deposited solder over that area but merely contributes to the formation of a coating of the required uniformity of thickness. However, as already stated, it is preferable for the drops to be deposited onto part only of the area of the flux coating and for the remainder of such area to become covered as a result of the spreading of the deposited solder. The drops of molten solder are preferably caused or allowed to spread to form the required solder layer before the drops solidify. In that case, the spreading may take place entirely under gravity and surface tension effects. However, the drops may be allowed to solidify before the required solder layer has formed in which case spreading has to be brought about subsequently with the aid of heat to re-melt the solder.

Preferably, the solder is supplied in the form of drops, as aforesaid, by spraying molten solder. By spraying the solder the whole or any given part of the flux coating can be quickly covered. If, as is recommended, the solder is sprayed onto a part only of the flux coating, it is not necessary for the solder spray to be nicely controlled so that a boundary of the spray coincides with a boundary of the flux coating. For example, molten solder may be sprayed onto a flux-coated margin of a glass sheet so that the solder droplets deposit on an area extending up to a notional line inset from the inner boundary of such margin, the remaining part of such flux-coated margin, extending up to that inner boundary, becoming covered due to spreading of the deposited solder on the flux coating. The solder does not require to be finely atomized. On the contrary, a coarse spray which can be formed with inexpensive spray equipment is adequate.

As one alternative to applying the solder in the form of drops, it may be deposited on the flux coating in the form of solid pieces or particles.

In certain embodiments of the invention the solder is supplied onto the flux coating in the form of a strip or thread directed along the area to be coated By starting with the solder in the form of a continuous strip or threat it is easier to spread the solder into a uniform layer over the area to be coated than when the solder is initially supplied in the form of separate drops. The strip or thread may be composed of solid solder or it may be composed of molten solder in which case the solder may, if desired, be allowed to solidify before it is spread.

The solder may be supplied to the flux coating in molten condition via a passageway, which may, for example, be the interior of a conduit, which does not exhibit any reduction in cross-sectional dimensions from its entry to its discharge end. When this feature applies, a continuous solder thread can be laid with a relatively low useful consumption of solder. Wastage of solder or conversion of solder by oxidation or otherwise to form necessitating undesirable consumption of energy for its recovery is avoided or reduced.

The invention includes processes in which the solder supplied onto the flux coating is force-spread thereon. The term "force-spread" denotes that spreading occurs by the exertion of heat energy rendering the solder flowable or more flowable or by exertion of mechanical force such as by an iron or other spreading member. Force-spreading is of course necessary in the case that the solder is supplied in solid form onto the flux coating or is allowed to solidify on such coating before spreading has occurred sufficiently to form a solder layer of the required thickness covering the flux coating or covering a required part thereof.

Preferably the spreading out of solder to form the solder layer is effected by a single pass of a spreading member. Spreading is thus very easily and quickly performed.

In certain processes using a said spreading member, this member, when not operative, is protected from the atmosphere by a non-oxidizing gas. It is desirable for any solder adherent to the spreading member to be prevented from becoming oxidized during any interval of time which may elapse between successive solder-spreading operations. By protecting the spreading member by means of a non-oxidizing gas, the protection can be easily and inexpensively achieved. However, as an alternative, use can be made of a solder bath, e.g., a bath which is temporarily raised beneath the spreading member and the surface of which can be renewed around the member by ejecting fresh solder withdrawn from beneath the surface, causing entrainment toward the edges of the bath of oxides formed by contact with the atmosphere. As a further alternative, the spreading member can be protected by a jet or jets of fluid, which may be a liquid or gaseous material.

The invention also includes a process of manufacturing a hollow glazing unit by soldering metallized and solder-coating margins of sheets of glass to an intervening spacer strip or strips, at least one margin of each sheet being both metallized and provided with a layer of solder before a contiguous margin of that sheet is metallized and provided with a layer of solder, characterized in that the solder layer is formed on said one margin using a process according to the invention as hereinbefore defined, by first spraying soldering flux onto said one margin up to a predetermined boundary and then supplying solder onto such flux coating and causing or allowing the applied solder to spread out thereon to form a solder layer of requisite thickness extending up to said boundary.

In certain embodiments of such process of manufacturing a hollow glazing unit, a margin or margins of the sheet contiguous with said one margin is or are metallized before the said spraying of soldering flux onto said one margin takes place so that the metallizing coating or coatings on said contiguous margin or margins keys or key directly to the metallizing coating on said one margin.

In other embodiments of such process of manufacturing a hollow glazing unit, the spraying of soldering flux onto said one margin is effected so that part of the metallizing coating on said one margin adjacent the inner boundary thereof is left free from flux coating at least at the corner regions of the sheet, and after forming on said flux coating a said solder layer extending up to the inner boundary of said flux coating, a contiguous margin or contiguous margins of the sheet is or are metallized so that such metallizing coating or coatings keys or key directly to an exposed part or to exposed parts of the metallizing coating on said one margin, the metallizing coating on the or each such contiguous margin being subsequently provided with a coating of solder.

The invention also includes apparatus for use in forming an adherent layer of solder metal on a metallized surface portion of a sheet of glass, such apparatus comprising a work support, means for supplying soldering flux to a metallized surface portion of a sheet of glass held by said support thereby to form a coating of flux on such metallized surface portion, and means for supplying solder metal onto said flux coating, characterized in that said flux applying means comprises a spraying device for spraying the flux onto said metallized surface portion and in that the apparatus includes a spreading means for spreading solder supplied onto such flux coating. This apparatus enables solder layers to be formed which are strongly adherent to the glass substrate, and which are confined within well defined predetermined boundaries.

Preferably, the spreading means is constituted by a solid member for contacting and spreading the solder. Preferably, means is provided for blowing non-oxidizing gas around said spreading member when it is inoperative, in order to prevent oxidation of solder which may remain adherent to the spreading member.

The invention includes apparatus comprising solder supplying means which supplies solder metal onto a said flux coating as a continuous strip or thread. Such means can operate very reliably and quickly to supply a required amount of solder along a given surface area.

Various embodiments of the invention, selected by way of example, will now be described with reference to the accompanying diagrammatic drawings, in which:

FIG. 4 is a front cross-sectional elevation of the solder applicator used in the apparatus;

FIG. 5 is a front elevation, partly in cross-section, showing the solder spreading device used in the apparatus;

FIG. 7 is a top plan view of a sheet of glass which has been metallized and coated with flux and solder by a process according to the invention;

Figure 1:
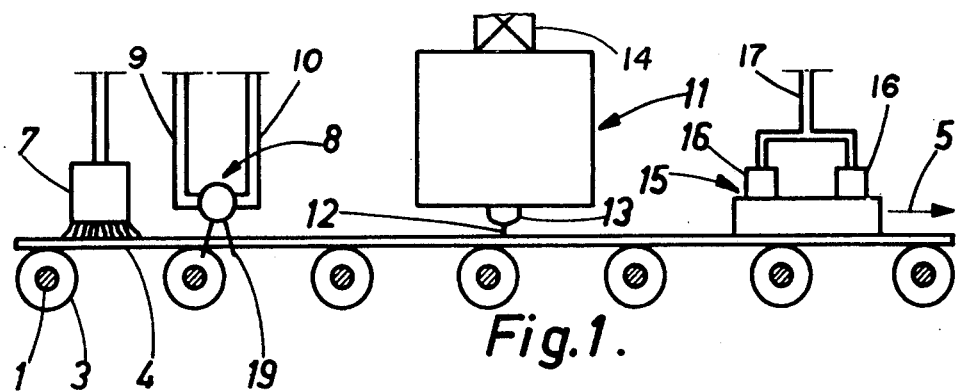
FIG. 1 is a front elevational view of an apparatus according to the invention, in use.
Figure 2:
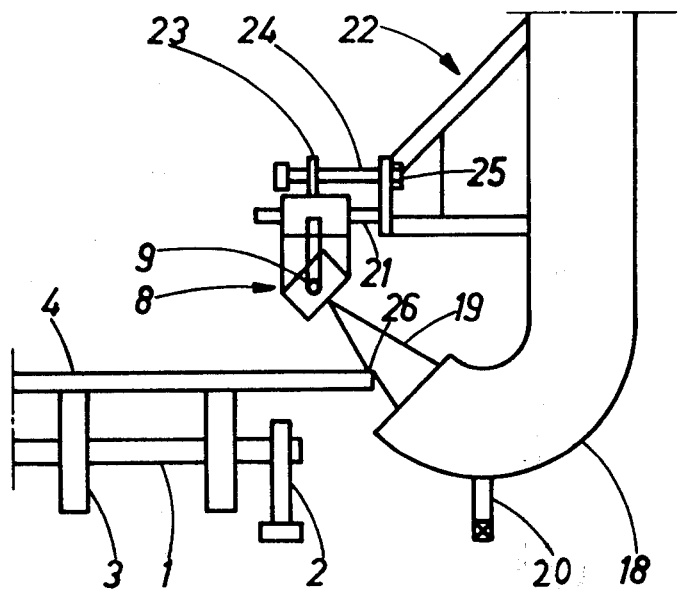
FIG. 2 is an end elevational view of the flux-coating station of this apparatus.

The apparatus which is the subject of FIGS. 1 to 6, comprises a work support in the form of a conveyor comprising a plurality of shafts 1 which are rotatably supported in side bearings 2 and carry rolls 3 for supporting a sheet of glass 4. Means (not shown) is provided for rotating the shafts 1 within the rolls 3 to cause conveyance of the sheet of glass in the direction indicated by arrow 5 in FIGS. 1 and 4. During the conveyance of the glass sheet, it is maintained in contact with a side edge guide (not shown) to insure that the sheet follows a predetermined linear path.

Prior to reaching the part of the conveyor represented in FIG. 1 the glass sheet is conveyed, e.g., by the same conveyor, through a metallization station (not shown) where a margin of the sheet is coated with a film 6 (FIG. 4) of a copper-based alloy in a manner well known per se. The said film is then subjected to a mechanical brushing treatment by means which is not shown, whereafter the sheet reaches the series of treatment stations represented in FIG. 1. At the first of these stations the metallizing film is subjected to a reducing treatment. This treatment is performed by a reducing flame which issues from a gas burner 7 and plays directly on the metallizing film.

On leaving the burner 7, each increment of length of the metallized margin of the sheet immediately passes beneath a flux atomizer 8 to which soldering flux is supplied via a conduit 9 and air under pressure is supplied via a conduit 10. The finely atomized soldering flux deposits on the metallizing film 6 to form thereon a thin uniform coating extending from the side edge of the sheet up to a well defined boundary line which may coincide with the inner boundary of the metallizing film 6 or may be inset from that boundary.

The next stage of the process comprises the supply of solder alloy onto the flux coating from a solder applicator 11. A thin stream 12 of molten solder discharges from a nozzle 13 at the bottom of the applicator, the discharge being controlled by a control device 14 mounted on top of the applicator. The metallized sheet margin bearing the flux coating and the deposited solder deposited thereon is then drawn beneath a solder spreading member or "shoe" 15 which is heated by two gas burners 16 to which combustible gas is fed via a conduit 17.

Adjacent the flux atomizer 8 there is a pipe 18 the upper end of which is connected to a suction pump (not shown) or other means whereby air is continuously sucked into the pipe through its lower end. The lower end portion of the pipe is curved upwardly so as to open toward the flux atomizer. Consequently all flux droplets in the atomizer discharge cone 19 which do not deposit on the metallized margin of the glass sheet, enter the pipe 18 under the aspirating forces therein. The flux droplets settle in the bowl formed by the curved lower end portion of the pipe 18 and can be drained off via a tube 20 which is fitted with a drain tap.

The atomizer 8 is slidably supported on a support pin 21 projecting from a fixed bracket 22. At the top of the atomizer there is a lug 23 which makes screw-threaded engagement with a bolt 24. The bolt 24 is rotatably mounted in a part of the bracket 22 and is retained by a nut 25. Rotation of the bolt 24 causes lateral displacement of the flux atomizer along the support pin 21. In that way the position of the atomizer can be adjusted to vary the width of the marginal zone 26 which is coated with soldering flux.

Figure 3:
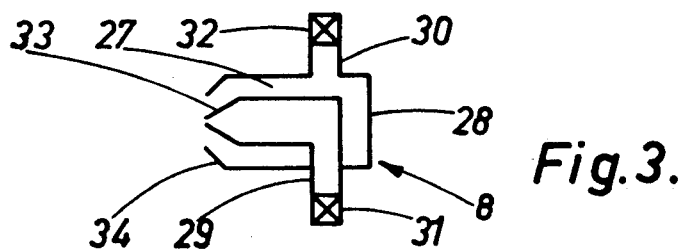
FIG. 3 is detail view showing in cross-section the construction of the flux atomizing head.

The atomizer head comprises, as is shown in FIG. 3, inner and outer co-axial chambers 27 and 28 to which soldering flux and compressed air are respectively fed via feed pipes 29 and 30, these pipes being fitted with flow control valves 31 and 32 respectively. The end portions 33 and 34 of the chambers 27 and 28 are of frusto-conical shape and define co-axial discharge orifices. The soldering flux discharges from the end portion 33 of chamber 27, directly into the stream of air under pressure discharging through the surrounding end portion of chamber 28. In consequence the soldering flux becomes finely atomized in the air stream under the action of the turbulent currents in the vicinity of the discharge orifices.

The solder applicator 11 comprises a container 35 on the top cover of which the solder discharge control device 14 is mounted. This control device is of electro-pneumatic type and is connected by a conductor lead 36 to a source of electric current, and by an air line 37 to a source of air under pressure. The electropneumatic control device 14 operates a needle valve 38. A sensing member (not shown) is located in the path followed by glass sheets during their movement by the conveyor and is connected into the control circuit of the device 14 so that the needle valve 38 is automatically lifted as soon as a glass sheet margin commences to travel beneath the solder discharge nozzle 13. As the trailing edge of the glass sheet reaches the said discharge nozzle the needle valve 38 automatically descends to terminate the discharge of solder from the container 35.

The discharge passage through the nozzle 13 does not exhibit any reduction in cross-sectional dimensions from the entry of such passage to its discharge orifice. This design feature is favorable for enabling the molten solder to be discharged as a thin thread providing a solder deposit 39 from which a solder layer of required thickness can be formed by spreading, with minimum wastage of solder.

As best shown in FIG. 5, the spreading of the solder deposit 39 is effected by a spreading member or shoe 15 comprising a chamber 40 having a perforated cover 41. Gas burners 16 protrude into the chamber 40 through the said perforated cover. The gas burners are fed with combustible gas via conduits 17 and the combustible gas is burned within the chamber 40 to keep the spreader member 15 at an appropriate temperature for spreading the solder. Combustion gases escape from the chamber 40 through the perforations in its cover.

The chamber 40 is supported by rods 42 suspended from a frame 43 fitted with guide blocks 44. Vertical guides 45 depending from a fixed support 46 extend through the guide blocks 44 and have their bottom ends provided with stops 47. A wheel 48 is rotatably mounted in bearings 49 supported by the frame 43. The wheel 48 extends into the path along which glass sheets are displaced by the conveyor and, when the leading edge of a glass sheet encounters the wheel 48, the sheet raises the wheel and with it the frame 43 and the spreading member 15 to the level necessary in order that it can spread the solder deposit 39 into a solder layer of the required thickness.

Figure 6:
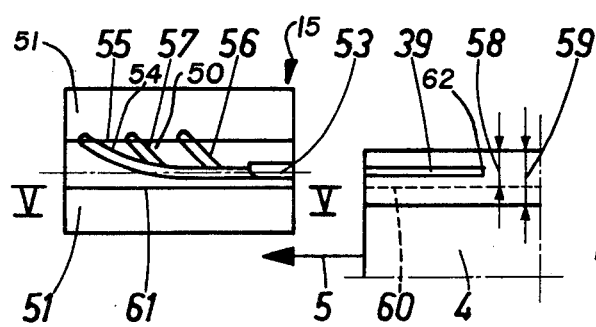
FIG. 6 is a bottom plan view on a smaller scale, showing the solder spreading member and part of a sheet of glass which is approaching the spreading member.

As best shown in FIG. 6, the bottom of the spreading member 15 is shaped to provide a central horizontal face portion 50 and abreast face portions 51 which are inclined upwardly and outwardly from the opposed side edges of the central face portion 50 to the sides of the spreading member. The central face portion 50 is curved upwardly as indicated by the broken line 52 in FIG. 5 at the rear end of the spreading member, i.e., at the end thereof at which it is approached by the glass sheets. Within the width of the face portion 50 that rear end of the spreading member is formed within a deep local recess 53. A shallow groove 54 extends from that recess, along part of the length of the face portion 50 and outwardly to the edge 55 of that face portion. Two shorter face grooves 56 and 57 branch from the groove 54 and also lead outwardly to that edge 55.

When the solder deposit 39 passes under the spreading member, the grooves 54, 56 and 57 assist the spreading and distribution of the solder and also cause excess solder to be displaced outwardly toward and past the edge of the glass sheet so that such solder can fall clear of the sheet and be recovered. By the action of the spreading member a solder layer 58 of uniform thickness is formed which covers the marginal zone (FIG. 2) which is coated with soldering flux. In other words, the inner boundary of the flux coating and the inner boundary of the solder layer 58 coincide.

FIG. 6 shows in bottom plan the position in which the spreading member 15 is located relative to the path of the glass sheet, in order to achieve the result described. The metallizing film 6 covers a marginal zone of the width designated 59. The flux coating extends over the lesser width 58. The broken line 60 indicates the inner boundary of the flux coating. The spreading member is located so that the inner edge 61 of the central horizontal face portion 50 will be directly above the line of the said inner flux boundary 60. The sheet of glass is in movement toward the spreading member in the direction of the arrow 5 and the deposit of solder 39 is in course of being laid along the flux coating, the position of the solder discharge orifice of the nozzle 13 at the instant considered being in coincidence with point 62. It will be noted that the line of the solder deposit 39 is in alignment with the recess 53 at the rear of the spreading member. The recess channels the solder deposit beneath the spreading member.

Reference is now made to FIG. 7 showing a glass sheet 4, three of the margins of which have been metallized, fluxed and solder coated. In a first stage, the left hand margin of the sheet was metallized by depositing a film 63 of copper. At the same time or subsequently, a copper film 64 was formed on the opposite margin of the sheet. The copper films 63 and 64 were partly coated with flux by spraying as hereinbefore described and layers 65 and 66 of solder metal were formed on the flux coatings. The inner boundaries of the flux coating and of the solder layer on each of the said opposed margins precisely coincide. At a subsequent stage, the top margin of the sheet was metallized. As the flux and solder coatings on the left and right-hand margins of the sheet are of lesser width than the metal films 63 and 64 deposited thereon, the portions of the metallizing film deposited on the top margin are keyed directly at the zones designated 68 and 69 to exposed portions of the metallizing films on the left and right-hand margins. After the metallizing of the top margin, the metal film thereon was coated with soldering flux by spraying and a layer 67 of solder was then formed thereon. In the case of the top margin, it is not necessary for any part of the metallizing film to be left uncovered by the flux and the subsequently applied solder metal and the coatings of flux and solder metal can extend up to the inner boundary of the underyling metallizing film. In a final stage, the bottom margin of the sheet is metallized, fluxed and solder-coated.

The solder spreading station of the apparatus also includes means for protecting the solder spreading member 15 from the atmosphere when the member is not operative. This means comprises a container (not shown) filled with nitrogen and connected to two conduits 70 directed toward the bottom of the spreading member. As a glass sheet passes from beneath the spreading member, a valve (not shown) is automatically opened to release streams of nitrogen from the conduits 70. The streams of nitrogen prevent oxidation of the solder wetting the bottom of the spreading member.

Figure 8:
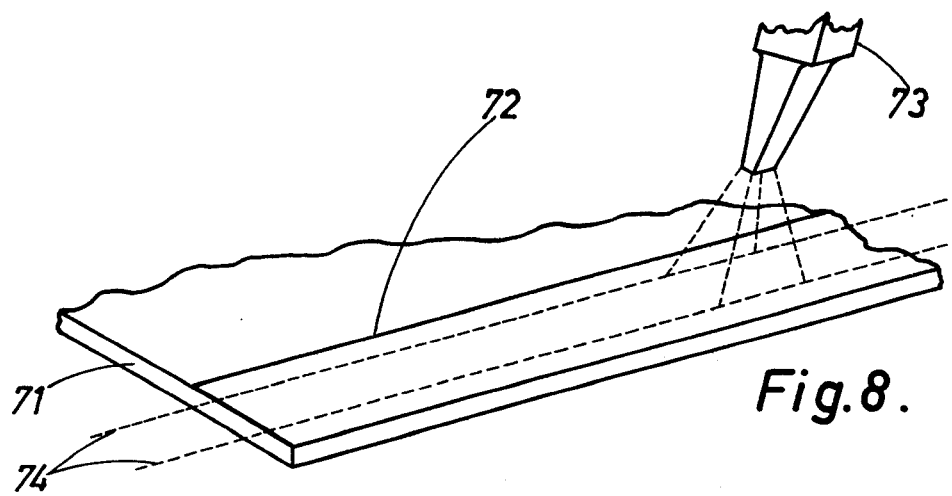
FIG. 8 is a perspective view illustrating the application of solder in another process according to the invention.

FIG. 8 shows the solder supplying stage of another process according to the invention. In this process, a margin of a sheet of glass 71 is metallized up to the boundary 72 and then soldering flux is applied to form a flux coating over the whole of that metallized margin, i.e., up to the same inner boundary 72. Molten solder is then sprayed onto the flux coating from a spraying device 73 as the sheet margin moves beneath the spraying device. The spray is adjusted and directed so that the solder droplets impinge on a zone 74 of lesser width than the marginal band which is metallized and flux coated. The spraying device provides a relatively coarse spray and it is not necessary for the width of the band 74 on which the droplets impinge to be precisely predetermined or to remain constant along the length of the margin. Due to the presence of the flux coating, the molten solder impinging on the coated margin spreads out under gravity and surface tension effects until the solder covers the whole of the flux coating.

Figure 9:
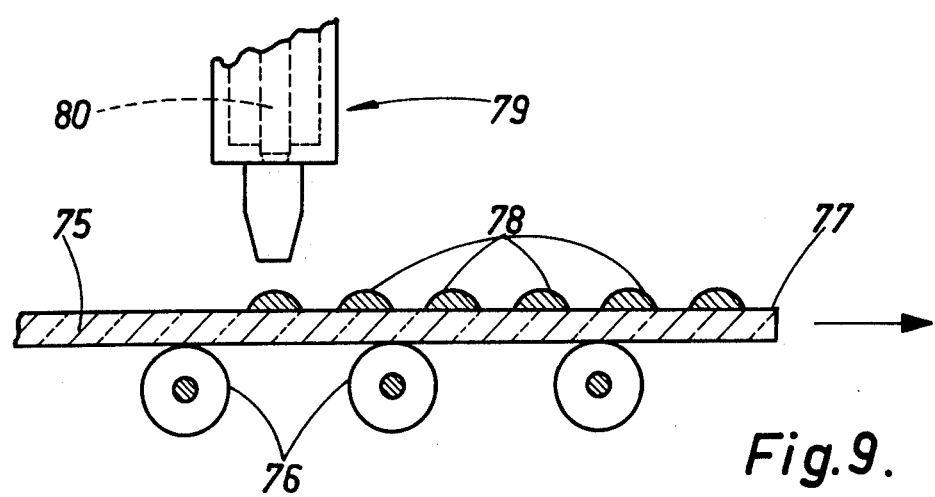
FIG. 9 is a front elevational view representing the application of solder in yet another process according to the invention.

The solder supplying stage of a further process according to the invention is represented in FIG. 9. In this process, a sheet of glass 75 is conveyed by conveying rollers 76. The glass sheet bears a marginal coating 77 comprising a metallizing film and a superimposed layer of soldering flux. As the sheet advances, drops 78 of solder are released onto the coated margin of the sheet from a solder dropper 79, the rate of release of the solder drops being automatically controlled, in dependence on the speed of advance of the glass sheet, by an internal valve 80 which is axially reciprocated between open and closed positions.

The following data relates to an actual process performed by means of apparatus as represented by FIGS. 1 to 6, with very good results:

| | | |
|---|---|---|
| Composition of solder: | Sn 50%, | Pb 50% |
| Composition of soldering flux: | Commercially available | |
| | abietic acid | 1 kg |
| | triethanolamine | 1.5 kg |
| | diethylene glycol | 1.5 kg |
| | isopropanol | 14.0 kg |
| Width of metallizing coatings (63,64 in FIG. 7): | 10 mm | |
| Width of flux coatings and superimposed solder layers 65,66: | 8 mm | |
| Amount of solder deposited: | 3.5 grams per meter | |
| Amount of nitrogen: | 30 litres per minute | |
| Length of spreading shoe (15): | 130 mm | |
| Speed of conveyor: | 20 m per minute | |
| Diameter of bore of nozzle 13: | 0.8 mm | |
| Distance of discharge orifice of nozzle 13 from upper surface of glass sheet: | 40 mm | |

Numerous modifications could be made to the described process. For example, the composition of the solder could be modified to include 2 percent of bismuth. The treatment stations represented in FIG. 1 need not follow immediately after a metallizing station; the metallizing can be performed at any time prior to fluxing and solder coating. The mechanical brushing of the metallizing coatings could be dispensed with, as also could the reducing burner 7. It is not essential to employ an aspirating device for collecting excess soldering flux. Automatic control of solder discharge from the container 35 could be dispensed with and the solder could be discharged continuously, means being provided for collecting and recycling solder discharged between the passage of sheets to be coated. The rear end of the spreading member could be chamfered sufficiently to permit it to be raised by contact with the leading edge of a glass sheet, so enabling the wheel 43 to be dispensed with. Moreover in an apparatus to be used for coating sheets of identical thickness, the spreading member need not be vertically displaceable but could be mounted at a fixed height. The grooving of the bottom of the spreading member could be modified or even dispensed with. Instead of protecting the spreading member by means of non-oxidizing gas, the protection could be afforded by a quantity of molten solder held in a receptacle which is raised into contact with the spreading member on completion of a spreading operation. Two or more spreading members could be provided for contacting deposited solder in succession. It is advantageous to provide an upper sheet holder having rotatable wheels or rolls for contacting the top face of a sheet so as to hold it firmly on the conveyor and to prevent vibration. Means may be provided for automatically adjusting the height of the flux atomizer 8 in dependence on differences in thickness from one sheet to the next so that the atomizer always operates at the same distance above the work.

What is claimed is:

1. A process of forming an adherent layer of solder alloy on a metallized surface portion of a sheet of glass preparatory to soldering to such surface portion a metallic member, which comprises the steps of spraying as an atomized mist a soldering flux onto said metallized surface portion to form a flux coating extending up to a predetermined boundary provided on a zone of said metallized surface portion, supplying solder onto the flux coating, and causing the supplied solder to spread out thereon to form a solder layer of requisite thickness extending up to at least a portion of said boundary.

2. A process according to claim 1 in which the metallized surface portion extends along a margin of the sheet of glass, and wherein the soldering flux is sprayed to form a flux coating over a substantially uniformly wide portion of the width of the metallized margin so as to leave an inner portion of the width of the metallized margin free of flux coating.

3. A process according to claim 1 wherein the soldering flux is sprayed through a zone overlapping the aforesaid margin of the sheet of glass and the overlapped portion of the zone through which the flux is sprayed is subjected to suction during spraying.

4. A process according to claim 1 wherein the solder is initially supplied onto part only of the area of the flux coating so that complete covering of such flux coating is dependent on the subsequent spreading of the solder.

5. A process according to claim 1 wherein the solder is supplied in the form of drops onto the flux coating.

6. A process according to claim 5 wherein the solder is supplied in the form of drops by spraying molten solder.

7. A process according to claim 1 wherein the solder is supplied onto the flux coating in the form of a strip or thread directed along the area to be coated.

8. A process according to claim 1 wherein the solder supplied onto the flux coating is force-spread thereon.

9. A process according to claim 8 wherein the spreading of the solder to form the solder layer is effected by a single pass of a spreading member.

10. A process according to claim 9 wherein said spreading member, when not operative, is protected from the atmosphere by a non-oxidizing gas.

11. In a process of manufacturing a hollow glazing unit by soldering metallized and solder-coated margins of a sheet of glass to intervening spacer strips in which at least one margin of said sheet is both metallized and provided with a layer of solder before a contiguous margin of that sheet is metallized and provided with a layer of solder, the improvement which comprises the steps of forming the solder layer on said one metallized margin by first spraying soldering flux as an atomized mist onto said one metallized margin up to a predetermined boundary provided on a zone of said one metallized margin and then supplying solder onto such flux coating and causing the applied solder to spread out thereon to form a solder layer of requisite thickness extending up to said boundary.

12. A process according to claim 11 wherein a margin of said sheet contiguous with said one margin is metallized before the said spraying of soldering flux onto said one margin takes place so that the metallizing coating on said contiguous margin keys directly to the metallizing coating on said one margin.

13. A process according to claim 11 wherein the spraying of soldering flux onto said one margin is effected so that part of the metallizing coating on said one margin adjacent the inner boundary thereof is left free from flux coating at least at the corner regions of the sheet, and the solder layer formed on said flux coating extends up to the inner boundary of said flux coating and thereafter a contiguous margin of the sheet is metallized so that such metallizing coating keys directly to an exposed part of the metallizing coating on said one margin, the metallizing coating on the contiguous margin being subsequently provided with a coating of solder.

14. A process as defined in claim 1 wherein the supplied solder is caused to spread out solely by the action of gravity and surface tension effects.

* * * * *